United States Patent [19]

Sicko et al.

[11] 3,899,776

[45] Aug. 12, 1975

[54] PROGRAMMABLE TERMINAL

[75] Inventors: John S. Sicko, Schenectady, N.Y.; Raymond J. Hodsoll, Jr., Salem, Va.; John T. Adamchick, Amsterdam, N.Y.

[73] Assignee: General Electric Company, Schenectady, N.Y.

[22] Filed: Feb. 28, 1974

[21] Appl. No.: 446,636

Related U.S. Application Data

[63] Continuation of Ser. No. 318,363, Dec. 26, 1972, abandoned.

[52] U.S. Cl. .............................................. 340/172.5

[51] Int. Cl.² ........................ G06F 3/00; G06F 9/00

[58] Field of Search .................................. 340/172.5

[56] References Cited

UNITED STATES PATENTS

| | | | |
|---|---|---|---|
| 3,275,988 | 9/1966 | Yetter | 340/172.5 |
| 3,465,299 | 9/1969 | Schellenberg | 340/172.5 |
| 3,686,639 | 8/1972 | Fletcher et al. | 340/172.5 |
| 3,753,243 | 8/1973 | Ricketts et al. | 340/172.5 |
| 3,810,118 | 5/1974 | Kiffmeyer | 340/172.5 |
| 3,849,765 | 11/1974 | Hamano | 340/172.5 |

*Primary Examiner*—Raulfe B. Zache
*Attorney, Agent, or Firm*—Daniel R. Levinson; Joseph T. Cohen; Jerome C. Squillaro

[57] ABSTRACT

A programmable terminal is disclosed in which a non-volatile memory in combination with decoding logic enables data collection and control of external devices. The memory can be programmed prior to assembly into the terminal or erased and programmed either on- or off-line. The terminal logs data in its entirety or only that data meeting programmed criteria. Specific examples of the use of the programmable terminal of the present invention are also disclosed.

12 Claims, 7 Drawing Figures

PROGRAMMABLE TERMINAL

This a continuation of application Ser. No. 318,363, filed Dec. 26, 1972, now abandoned.

This invention relates to terminals, with which a computer interfaces with the outside world, and, specifically, to a programmable terminal that is useful either in conjunction with a computer (on-line) or by itself (off-line).

The hierarchy of computers, in terms of capacity and number of different functions that can be carried out, may be described as follows: First there is the general purpose computer having a very large memory capacity (over $10^7$ bits) and capable of a wide variety of functions. Next is the so called mini-computer, having a more modest memory capacity ($10^4 - 10^7$) bits and capable of only a few less functions than a general purpose computer.

Next is the micro-computer. This is the smallest device currently available that has a memory and is capable of computation. The memory is small ($10^3$ - $10^5$ bits) and the functions are limited; typically, add, subtract, multiply, divide, logarithm and trigonometric functions.

The lowest order in this hierarchy is held by devices that are not really computers at all, i.e. they do not compute or calculate, rather they react. The simplest example of such a device is a circuit breaker. If the current exceeds a preset value, the circuit is opened. There is no calculation. Conceptually similar but more elegant devices include a variety of logic circuits as used, for example, in process control systems. These logic circuits, however, are "hard wired," i.e. the logic is set once the logic elements are wired together. The only way to change the logic is to unsolder the elements and reconnect them a different way.

An alternative to the hard wiring of control logic is to store the program logic in a computer. However the cost of a computer, even mini-computer, is not insignificant. Conversely, the lower initial cost of hard wired logic may be more than offset by early obsolescence.

Thus, there is a need for logic circuitry that can be readily changed. Further, there is a need for an economical alternative to the computer as a process control means. In general, there is a need for a terminal that is more than merely passive yet not so complex as to be able to calculate.

In view of the foregoing, it is therefore an object of the present invention to provide a programmable terminal.

Another object of the present invention is to provide a non-calculating terminal capable of both data logging and control operations.

A further object of the present invention is to provide an on-line or off-line programmable terminal.

Another object of the present invention is to provide a versatile, low cost, readily alterable, data collection and control terminal.

The foregoing objects are achieved in the present invention wherein a programmable memory, preferably non-volatile, with control and logic circuits combine to provide a simplified and lower cost control and data handling terminal.

A more complete understanding of the present invention can be obtained by considering the following detailed description in conjunction with the accompanying drawings, in which.

Figure 1:
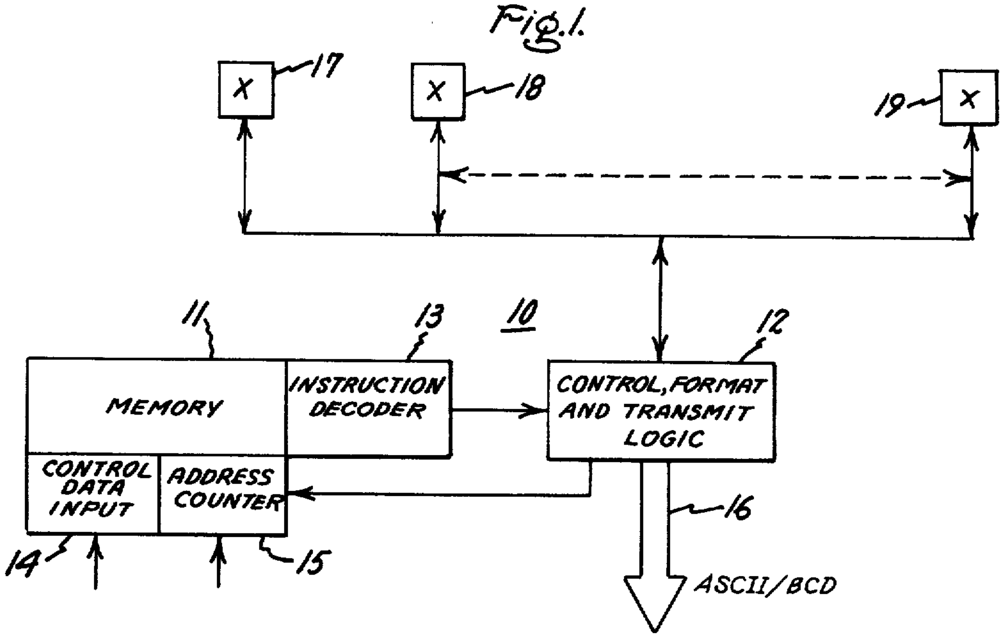
FIG. 1 is a simplified block diagram of the present invention.

Referring to FIG. 1, terminal 10 comprises a memory 11 and control, format and transmit logic circuitry 12. Interconnecting the memory, which may conveniently comprise a random access memory, and control, format and transmit logic circuit 12 is decoding and instruction decode logic 13. Logic 13 serves as an interface mechanism between the random access memory and the further logic contained within logic 12. Inputs to memory 11 comprise a control data input 14 and an address counter 15. Control data input 14 serves to interconnect the random access memory with the outside world and enables terminal 10 to be programmed both on-line and off-line. Address counter 15 supplies the address information to memory 11, thereby enabling the memory to vary the output signal thereof in accordance with conditions within terminal 10. The output from terminal 10 comes from logic circuit 12 and is indicated by arrow 16. The output from terminal 10 may be in standard teletypewriter code, that is the American Standard Code for Information Interchange (ASCII), or in binary coded decimal (BCD) form. While not part of terminal 10 proper, transducers 17, 18 and 19 are illustrated as connected to logic circuit 12. These transducers can be of any suitable type such as for supplying information about an external condition to logic circuit 12 or active transducers for carrying out commands under the control of memory 11 by way of logic 12.

The operation of terminal 10 may best be understood by considering two representative examples of the types of functions that can be carried out by terminal 10. One such function is that of data logging in which data from an external device is recorded off-line by terminal 10 for future use. In performing the data logging operation, the information stored in memory 11 is read, decoded and transmitted by logic 13 to control, format, and transmit logic 12 wherein it enables control logic 12 to convert the information from an external transducer, for example transducer 18, into either BCD or ASCII code.

Terminal 10 in accordance with the present invention is also capable of carrying out closed loop control functions wherein, for example, the temperature of a processing oven is to be maintained within predetermined limits. In this situation, one transducer, for example transducer 17, supplies electrical signals proportional to temperature to logic circuit 12. Within logic circuit 12 these electrical signals proportional to temperature are compared with signals from memory 11 to determine whether or not the temperature is within the determined limits. If the temperature is not or is drifting toward one boundary, this condition is sensed and a control signal is transmitted from control, format, and transmit logic circuit 12 to a suitable control transducer, for example transducer 19, which may control either the current through heating coils or the flow of gas to a burner.

Thus the terminal of the present invention is capable of autonomously controlling a process. In addition to this control, one could also obtain a record of the temperature variations by instructing logic circuit 12 to print out the temperature being sensed.

Figure 2:
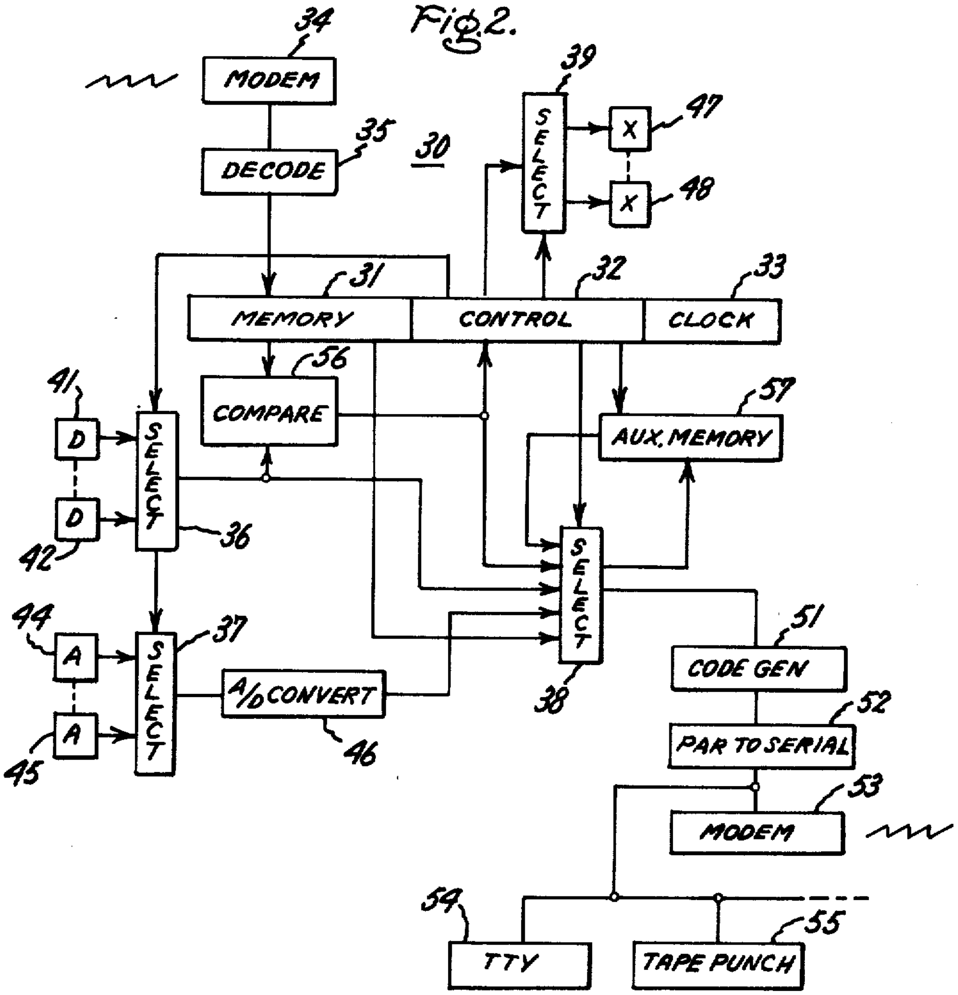
FIG. 2 is a signal flow diagram of the present invention in conjunction with ancillary apparatus controlled by the terminal of the present invention.

FIG. 2 illustrates in more detailed form the preferred embodiment of the present invention. In FIG. 2 control terminal 30 comprises a memory 31, control logic 32, and a source of clock signals 33. As before, memory 31 preferably comprises a random access memory that is alterable but not volatile. Memory 31 may conveniently be programmed either before assembly into terminal 30 or after assembly by supplying suitable signals by way of modulator-demodulator (modem) 34 and decode circuitry 35. Programming by way of modem 34 and decode circuit 35 may be either on-line or off-line.

Connected to control circuit 32 are a plurality of selection circuits 36, 37, 38 and 39. Coupled to the inputs to selection circuit 36 are a plurality of digital input transducers 41–42. Coupled to the input of selection circuit 37 are a plurality of analogue transducers 44–45. While consecutively numbered it should be understood that transducers 41–42 and 44–45 represent any desired number of input transducers. Transducers 41–42 represent those transducers producing a digital output signal. Transducers 44–45 represent those transducers whose output signal is analogue and which must be converted to a digital format. This is accomplished by analogue to digital converter 46 coupled to the output of selection circuit 37. Coupled to the outputs of selection circuit 39 are a plurality of transducers 47–48 which are used for executing commands given by memory 31 in conjunction with control circuit 32. Selection circuit 38 enables the selection of one of a plurality of internal inputs which is then coupled to the outside world by way of code generator 51, parallel to serial bit conversion means 52, and modem 53. Suitable recording means for recording the otuput signal from terminal 30 are represented by teletype 54 and tape punch 55 which are connected to the output of parallel-serial bit conversion means 52.

Terminal 30 also preferably comprises an internal comparison circuit 56 and an auxiliary memory 57. Comparison circuit 56 is used to compare input information with information stored within memory 31 and to produce an output signal as a result of that comparison. This output signal is coupled as one input to selection circuit 38 and also as an input to control circuit 32. Auxiliary memory 57 serves as a temporary storage mechanism and can be utilized for storing the output signals from selection circuit 38 under the control of control circuit 32. Auxiliary memory 57 has its output connected as one of the inputs to selection circuit 38. As illustrated in FIG. 2, selection circuit 38 has a plurality of inputs that are internal to terminal 30 and comprise auxiliary memory 57, comparison circuit 56, selection circuit 36, selection circuit 37 and memory 31.

The operation of terminal 30 may best be understood by considering the following examples. As previously noted, memory 31 is programmed or reprogrammed by suitable input signals to modem 34 and decode logic 35. As noted above, one of the inputs to selection circuit 38 comprises an output from memory 31. In this way, the programming of memory 31 is monitored by a series of write and read cycles in which the information is stored in memory circuit 31 and then nondestructively read out so as to provide a check on the correctness of the stored information. This operation could be considered remote memory writing and checking.

As previously noted, a terminal in accordance with the present invention is also useful for data logging. In carrying out this function one of selection circuits 36 and 37 is activated to couple one of inputs 41–42 or 44–45 to selection circuit 38. Selection circuit 38 is activated to couple to the input thereof the appropriate input signal. At the output of selection circuit 38, code generator 51, parallel to serial bit conversion means 52, teletypewriter 54 and tapepunch 55 are actuated to provide a printed and tape record of the information coming from the selected transducer.

A modification of the above operation is to log only selected data meeting predetermined criteria. This is accomplished by actuating comparison circuit 56 which then compares the information coming from selection circuit 36 with the information stored within memory 31. When the comparison criteria are met, comparator 56 provides a suitable output signal actuating control 32 which in turn activates selection circuit 38 to select the output from selection circuit 36 and couple this output to code generator 51. If, for example, transducer 41 produces an output signal proportional to voltage, then comparator 56 is actuated to provide an enabling signal only when the voltage exceeded a predetermined level. This has the effect of reducing the amount of records that have to be scrutinized, either manually or by way of computer, and automatically eliminates uninteresting information. While comparator 56 is shown as only connected to selection circuit 36, obviously another input and suitable selection circuitry could be provided from the output of A/D converter 46.

Auxiliary memory 57 can be utilized in conjunction with comparator 56 to store information leading up to the transition across the voltage threshold established by memory 31 and comparator 56. This storage of information within auxiliary memory 57 enables one to look back at the transition to determine for example whether it was gradual or abrupt.

Control circuit 32 can also be utilized to actively control a plurality of transducers by the selection of one of transducers 47 through 48 by way of selection circuit 39. this is done for example in the above described temperature control function wherein the output of comparator 56 is used to actuate control circuit 32 to cause one of transducers 47–48 to provide a suitable correction for the change taking place.

The foregoing examples are not exhaustive of the possibilities of terminal 30 but merely representative. A more complete appreciation of the flexibility of a terminal in accordance with the present invention can be obtained by considering FIGS. 3–7 in which a detailed block diagram of the preferred embodiment of the present invention is illustrated.

Figure 3:
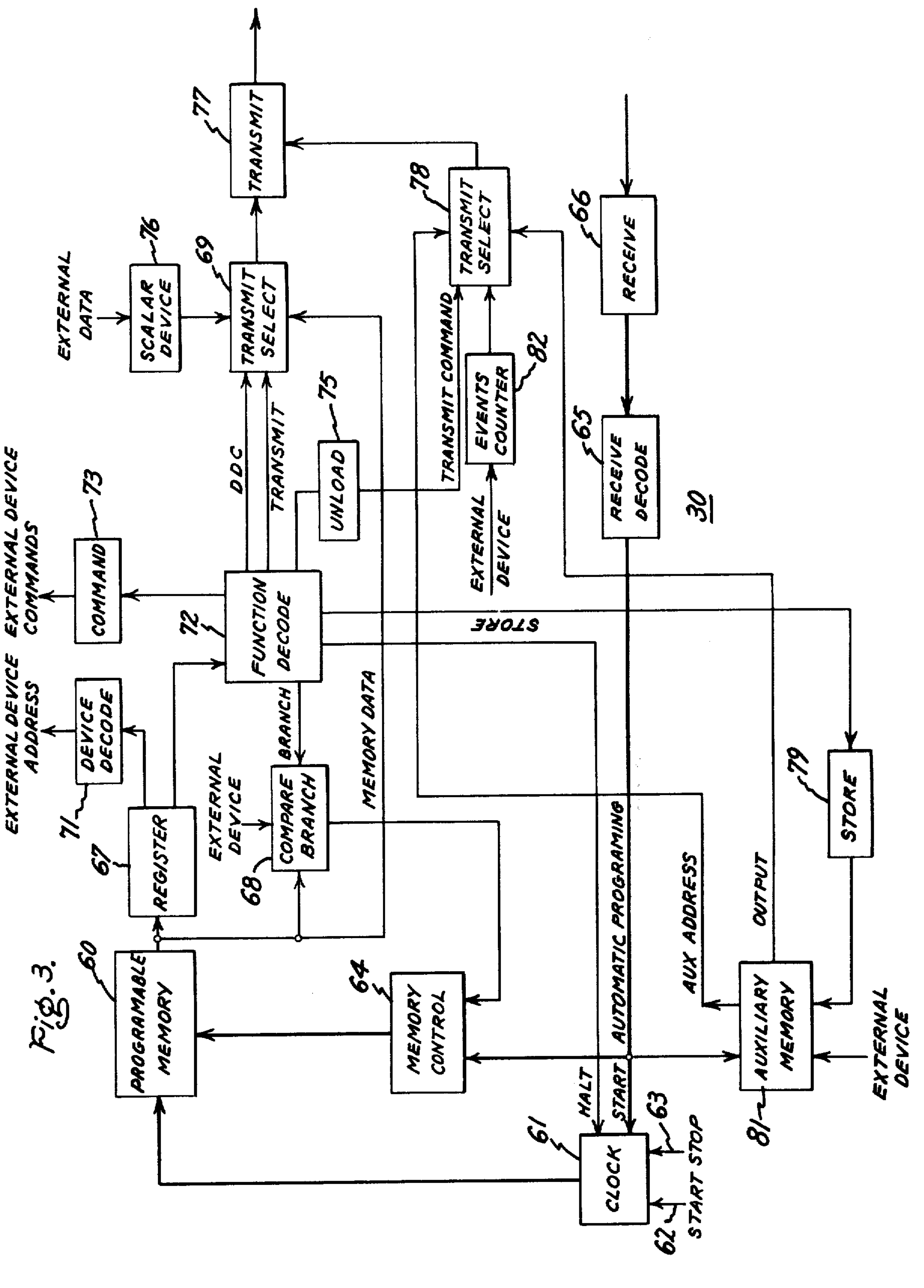
FIGS. 3–5 and 7 are the same detailed block diagram of the present invention, but with different connections emphasized to illustrate the functions Programming, Data Log, Selective Data Log, and Monitor and Control, respectively.

In FIG. 3, programmable random access memory 60 has one input connected to a source of clock signals 61 and another input connected to memory control circuit 64, which has one input thereof connected to receive decode circuit 65 for decoding input signals from receiver 66.

Clock 61 has external start and stop inputs 62 and 63, respectively. Internal inputs to clock 61 include a start lead connected to decoder 65, for remotely starting the terminal, and a halt lead connected to function decoder 72, for placing terminal 30 in a stand-by condition; for example, when awaiting instructions from an external source.

The output from programmable random access memory 60 is connected to register 67, compare branch circuit 68 and transmit select circuit 69. The outputs from register 67 are coupled to device decoder 71 and function decode circuit 72. The output from function decode circuit 72 is connected to command circuit 69 and to unload circuit 75. External data received from transducers represented by scalar 76 is in the form of a 4-bit binary coded decimal signal coupled to transmit select circuit 69. The output from transmit select circuit 69 is connected to transmit circuit 77 which converts bit data from parallel to serial and transmits the data over a suitable transmission link. A second transmit select circuit 78 is also coupled to transmitter 77 for supplying transmitter 77 with parallel data from either an auxiliary memory 81 or an external events counter 82. Auxiliary memory 81 is connected to receive decode circuit 65 and to store control signal decoder 79 which receives the store control signal from function decoder 72.

It will be noted that some of the interconnecting lines in FIG. 3 are heavier than the remainder. These lines indicate the signal flow through terminal 30 in the programming mode. As previously noted, programmable memory 60 may be programmed remotely by transmitting suitable signals to terminal 30 which are received by receive 66 and decoded by receive decode circuit 65. The code supplied is decoded by receive decode circuit 65 and applied as an output signal to clock 61 and memory control 64. Clock 61 and memory control 64 cooperate by applying input signals to programmable memory 60 so as to write information into the memory.

While not illustrated by a heavier line interconnecting the appropriate elements, if desired the programming of memory 60 may be accomplished by a write then read cycle in which the information is written into memory 60 then read out by way of transmit select circuit 69 and transmitter 77.

Programmable memory 60 may comprise any suitable random access memory (RAM). One commercially available memory found suitable is a Mini-RAM available from Memory Systems, Inc. This particular memory is a plated wire memory having 1,280 bits organized into 128 words of 10 bits each. Other types of memories, such as semiconductor memories are also suitable.

The signals from memory 60 circulating throughout terminal 30 comprise words having address and data portions, with different portions of the terminal having a unique address so that, while many circuits receive the signal only the desired circuit responds. This type of format, as well as the specifics of the logic involved, is known per se in the art and need not be detailed here.

The present invention may be implemented in any of the several known semiconductor technologies, e.g., discrete components, integrated circuits, or large scale integrated circuits (LSI). The following table is an example of the present invention, as illustrated in FIG. 3, implemented with integrated circuits. It is understood, however, that the following is exemplary only and not exhaustive of the types of semiconductor devices that may be used in implementing the present invention.

| BLOCK | FIG. 3 BLOCKS COMPONENT(s) | MANUFACTURER |
|---|---|---|
| 61 | 9602, 953 | Motorola |
| | 936 | Fairchild |
| 64 | 8267, 8281 | Signetics |
| 65 | 8250 | Signetics |
| 66 | MC 2259L | Motorola |
| 67 | SN 7474 | Texas Instruments |
| 68 | SN 7475 | Texas Instruments |
| | SN 74L85 | Texas Instruments |
| 69 | 8267 | Signetics |
| 71 | N 8250 | Signetics |
| 72 | N 8250 | Signetics |
| | 946 | Fairchild |
| 73 | 936, 946, 952, 953 | Fairchild |
| 75 | 936, 946, 952, 953 | Fairchild |
| 77 | MC 2257L | Motorola |
| 78 | 8267 | Signetics |
| 79 | SN 7474 | Signetics |
| 82 | 8281 | Signetics |

All of these devices are commercially available and are described in the respective manufacturer's handbooks or specification sheets as well as by independent services such as D.A.T.A., Inc., Orange, New Jersey. Examples of manufacturers' handbooks include "DCL Specifications Handbook," Vols. I and II, Signetics Corporation, 1969; "TTL Integrated Circuits Catalogue," Texas Instruments, Inc., 1969; "MSI Pocket Guide,," Fairchild Semiconductor, 1970; and "The Microelectronics Data Book," Motorola Semiconductor Products, Inc., 1969.

Figure 4:
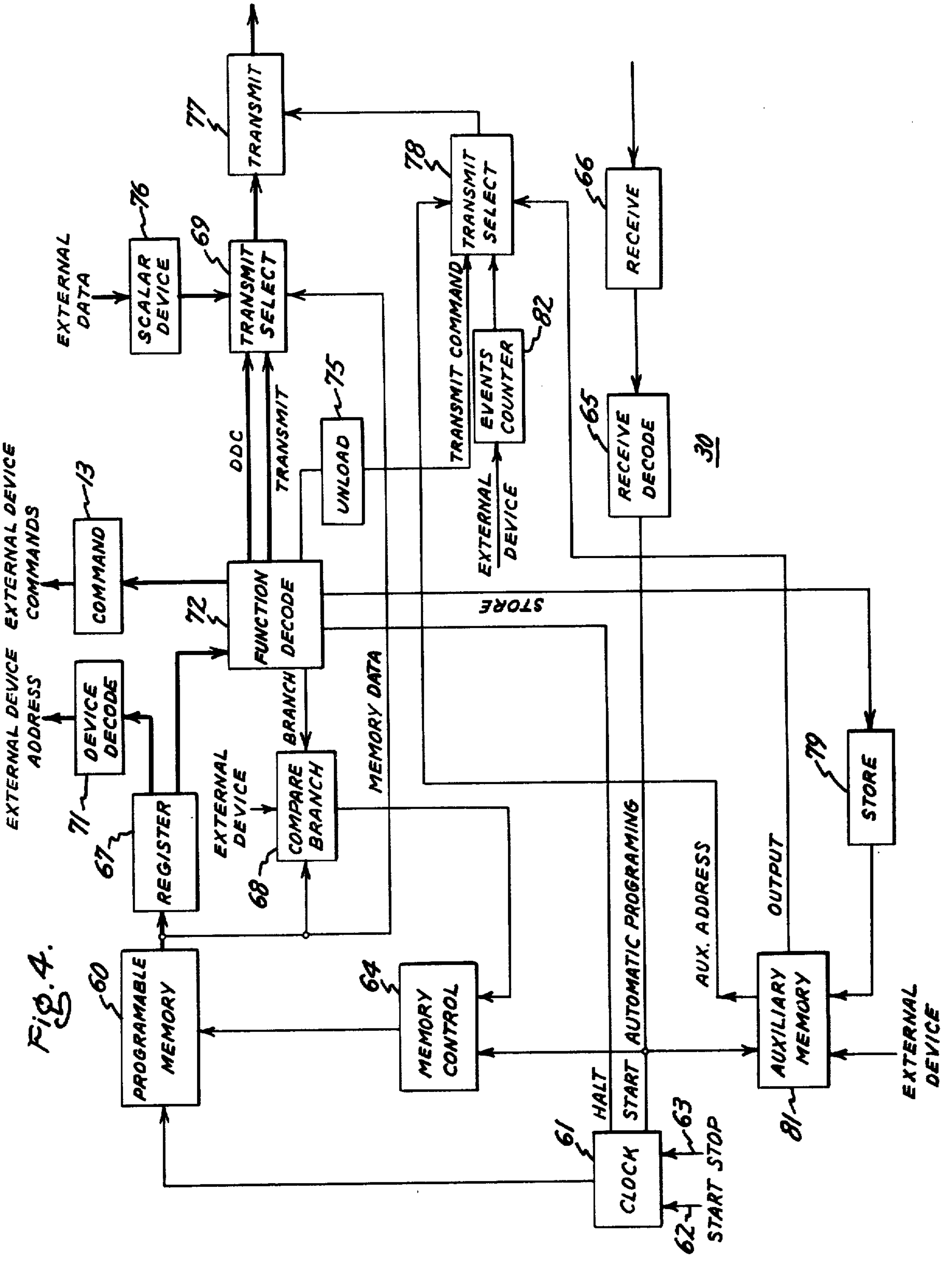
Figures 5, 6:
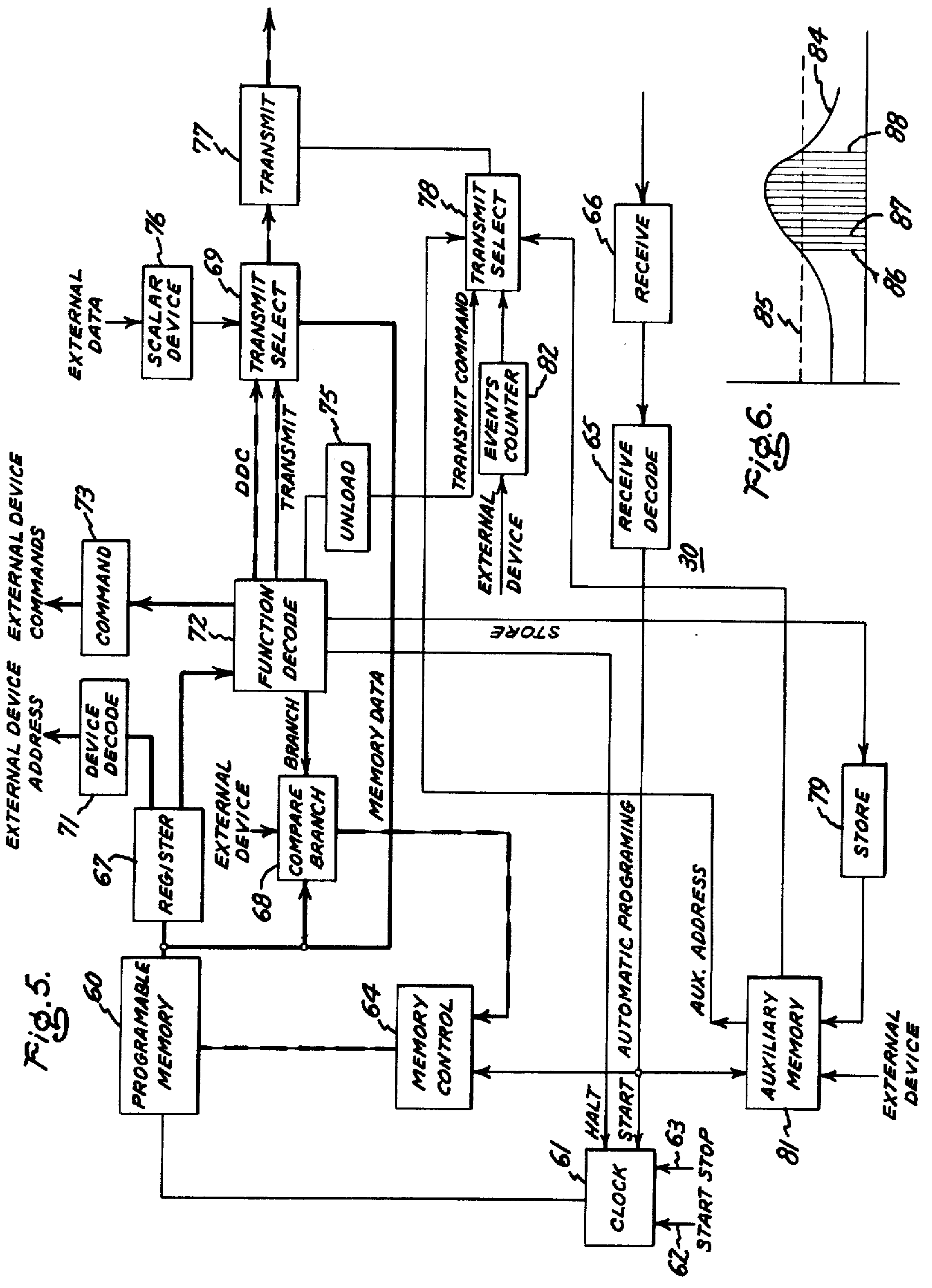
FIG. 6 is a waveform useful in explaining the operation of the present invention.
Figure 7:
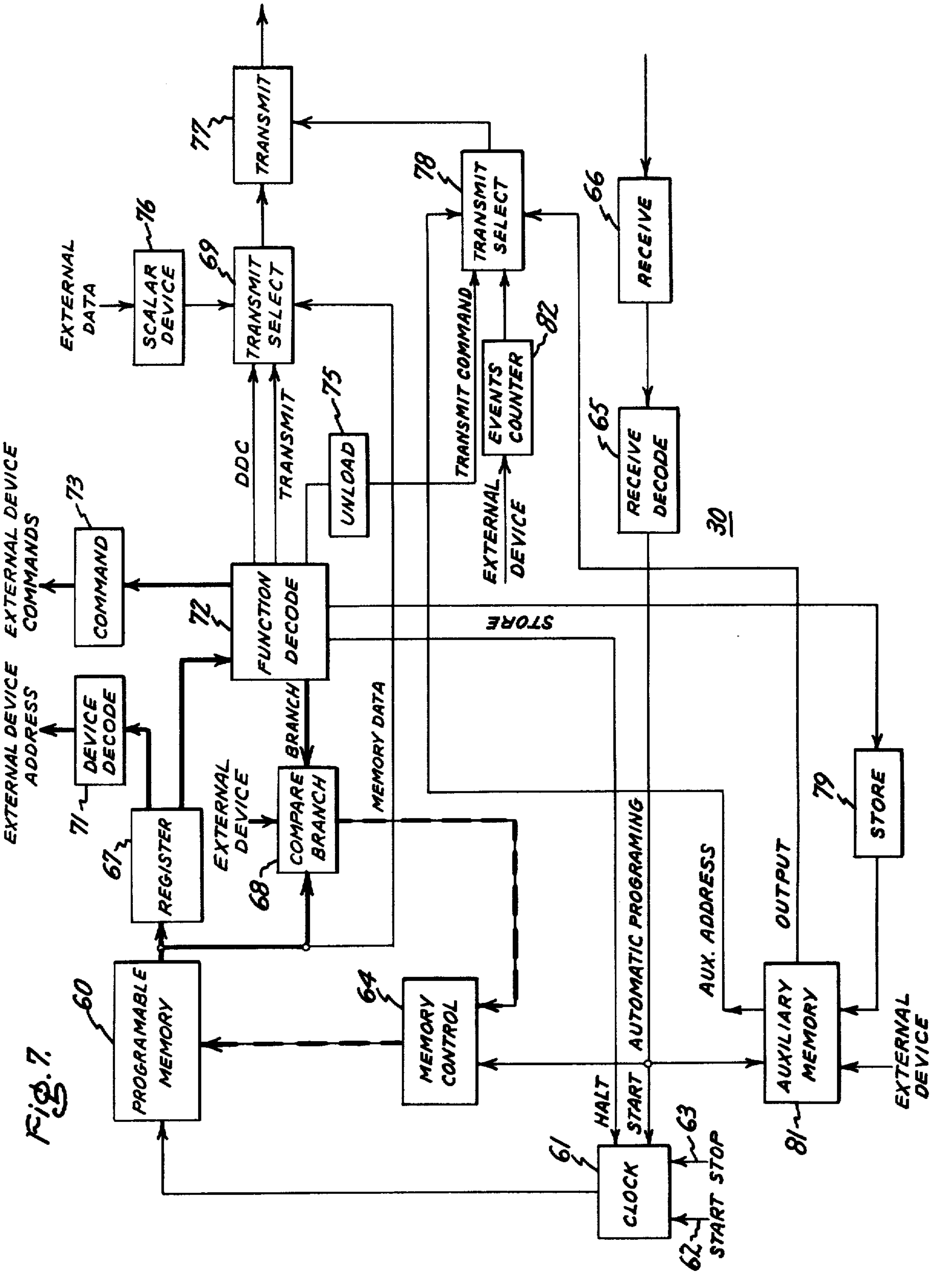

Additional examples of the operation of terminal 30 are illustrated in FIGS. 4, 5 and 7 in which the blocks and interconnections are the same, but different interconnections are emphasized depending upon the function to be carried out.

FIG. 4 illustrates terminal 30 performing the data log function in which information from an external device is recorded, for example, by teletype or punched tape. In this mode of operation programmable memory 60 produces an output signal that is applied to register 67 and separated into an address and command signal by way of device decode 71, function decode 72, and command circuit 73. Device decode circuit 71 and command circuit 73 serve to select the external device and tell it what to do, respectively. Upon the selection of the external device and the read command being applied to these circuits, external data is supplied by scalar device 76, which may for example comprise a digital voltmeter, in binary coded decimal form. This information is applied to transmit select circuit 69 and to transmitter 77 where it is converted into serial digital data and coupled to a suitable transmission link or to a recording device such as a teletypewriter or a tapepunch mechanism. In this manner, the digital information is continuously recorded by the terminal.

Function decode circuit 72 supplies two sets of signals to transmit select circuit 69. One is the code word on the digital data control line (DDC) that causes transmit select circuit 69 to select the digital data coming in from scalar 76. The other is on the transmit line and contains internal data directly from memory 60, that is, format information such as carriage return, line feed and the like. The signal on the transmit line causes transmit select circuit to transfer the digital data from scalar 76 to transmit circuit 77.

FIGS. 5 and 6 illustrate a somewhat similar but more complex function herein referred to as selective data logging wherein the information is not simply recorded, but is only recorded if it meets certain predetermined criteria. As with FIG. 4, FIG. 5 illustrates the same blocks and interconnections but with some of the interconnections emphasized to illustrate the flow of information through the terminal in performing the particular function. Selective data logging is illustrated in FIG. 6 wherein a waveform 84 representing the phenomenon being monitored is compared with a predetermined level 85 to determine whether or not the amplitude of the waveform exceeds the predetermined level. It will be assumed for this example that waveform 84 is of interest only when it exceeds predetermined level 85. When this happens, it is desired to log the information describing waveform 84. In doing this a plurality of readings, 86, 87–88, are taken of the waveform and logged by terminal 30.

Referring to FIG. 5, this is accomplished by an output signal from programmable memory 60 applied to register 67 and compare branch 68. As previously described, register 67 and function decode circuit 72 select the device to be activated and the command given by way of decoder 71 and command circuit 73, respectively. The external device or scalar selected has its output connected to compare branch 68 wherein the output from the selected scalar is compared with information from programmable memory 60. Compare branch 68 is activated by a branch function code signal from function decode circuit 72. While not illustrated as a separate element, the output signal from programmable memory 60 is decoded by suitable decoding apparatus within the compare branch to determine the information to which the external device is to be compared.

Again referring to FIG. 6, if the amplitude of waveform 84 does not exceed reference amplitude 85 as indicated by programmable memory 60, then nothing happens and another sample is taken. If this subsequent sample comprises for example sample 86, then an output from compare branch circuit 68 to memory control 64 in effect tells programmable memory 60 that this information should be stored. Programmable memory 60 then produces an output signal actuating register 67 and function decoder 72. Function decoder, in turn, produces an output signal on the digital data control line and the transmit line to actuate transmit select circuit 69 so that the information from the external device is read out, formated and logged as indicated previously in conjunction with FIG. 4.

Subsequent samples are compared in compare branch 68 to determine whether or not they should be logged. The process thus continues so long as waveform 84 exceeds reference level 85. When waveform 84 is less than reference level 85, no more data is transmitted by transmitter 77 and logged. Rather a plurality of successive comparisons are made within the compare branch 68 to determine whether or not each sample taken exceeds the predetermined reference level. Beyond this, terminal 30 does nothing until waveform 84 again exceeds reference level 85.

As also illustrated in FIG. 5, auxiliary memory 81 is also connected to the external device. This provides a capability of, for example, recording temporarily all of the readings taken from the external device in such a way that one can, if desired, look back at the transition of waveform 84 across reference level 85. This is accomplished by utilizing, for example, a 10 word memory for auxiliary memory 81. As each sample is taken it is recorded in auxiliary memory 81 until all 10 words have been filled. The next sample taken is then written over the first word within auxiliary memory 81 so that at any given point in time, the preceeding 10 samples are available.

Thus, referring to FIG. 6, assuming sample 86 has just been stored in auxiliary memory 81, then the preceeding nine samples are also stored within auxiliary memory 81. Thus, one can, if desired, cause auxiliary memory 81 to read out through transmit selection circuit 78 to also log the period of transition of waveform 84 across reference level 85.

Obviously, this is only one function auxiliary memory 81 can serve. Auxiliary memory 81 can also be utilized for storing information from a different external device from the one being read out at a given time. Thus one is able to have terminal 30 store simultaneously occuring information in a relatively simple manner without duplicating recording apparatus.

FIG. 7 illustrates the flow of signals through terminal 30 when performing a monitor and control function. The monitor and control function is similar to the selective data logging function. An output signal from programmable memory 60 causes register 67 and function decoder 72 to select and read out an external device under the control of device decoder 71 and command decoder 73. The information is applied as one input to compare branch circuit 68. If the applied information from the external device meets predetermined criteria as established by programmable memory 60, then an output signal is generated and applied to memory control circuit 64 which in turn activates programmable memory 60.

Programmable memory 60 then produces a coded output signal that is applied to register 67 and thence to function decode circuit 72 causing device decoder 71 and command decoder 73 to cause a particular transducer to execute a predetermined function.

For example, in the electrical power distribution field there is a need for what are known as power demand limit control devices. It is common practice in this field, to enable the power company to organize its distribution of power, for the power company to charge a heavy premium when a particular value of power consumption is exceeded. Thus it is desirable for the commercial subscriber not to exceed this limit and hence to incur the premium.

Utilizing terminal 30 as a power demand limit control device, the input information to compare branch circuit 68 is the power dissipated by a manufacturing plant, for example. The information from programmable memory 60 would represent the power limit that is desired to be used based upon the limit set with the power company supplying electrical power to the manufacturing plant. When compare branch circuit 68 detects that the power consumption is approaching this limit, an output signal is produced that actuates memory control 64 and programmable memory 60 to cause the power to be shut off to what have been determined as nonessential power consuming devices, for example, selected lighting, office air-conditioning, water coolers or the like. This would be carried out by a command signal from memory 60 by way of register 67 and function decoder 72 to command decoder 73 which would then actuate the necessary circuit breakers.

As previously noted, auxiliary memory 81 could be used simultaneously as a storage mechanism for monitoring the power consumed during a predetermined interval. That is, one function being performed can be combined with other functions within terminal 30. Also, it should be understood that receive 66 and receive decode 65 can be used not only for automatically programming programmable memory 60, but also for applying control signals directly to memory control 64 for ultimately actuating command decoder 73. In other words, while terminal 30 can operate independently, it can also operate on-line in conjunction with a plurality of other such terminals under the control of a central computer for example.

There is thus provided by the present invention a terminal capable of filling a great need in modern technology, i.e., a terminal device that is flexible, low in cost and capable of either independent or on-line operation. Having thus described the invention, it will be apparent to those of skill in the art that various modifications can be made within the spirit and scope of the present invention. For example, while the output from the terminal is illustrated as being recorded by a tele-type or tapepunch, other suitable display or recording means may be utilized, such as magnetic tape recording. While modems 34 and 53 are illustrated as providing access to terminal 30, any suitable transmission link may be used including direct access to a computer or other source of signals. Further, while compare branch circuit 68 has been described in terms of producing an output only when the input data exceeds the stored information, obviously the comparison can be for less than or equal to as well. Also, while illustrated as a single, physically separate memory, auxiliary memory 81 may conveniently comprise an unused portion of programmable memory 60 or a plurality of memory units.

What we claim as new and desire to secure by Letters Patent of the United States is:

1. A programmable terminal for operating on-line or off-line to control or monitor a plurality of external devices comprising:
- memory means for storing program and control information;
- logic means coupled to said memory means and said external devices for converting information from said memory into control signals, said logic means including external selection means for selectively activating at least one of said external devices;
- comparison means coupled to said memory means and said external devices for comparing incoming information with information from said memory means;
- internal selection means, coupled to said memory means and said external devices, for selecting one of a plurality of internal signals for transmission from said terminal, said internal signals including said control signals and signals received from selectively activated external devices; and
- output means, coupled to said internal selection means, for providing an output signal from said terminal.

2. A terminal as set forth in claim 1 and further comprising:
- auxiliary memory means for temporarily storing a predetermined quantity of information, said auxiliary memory means being coupled to said internal selection means and coupled to and controlled by said logic means.

3. A terminal as set forth in claim 1 and further comprising:
- receive decode means coupled to said memory means for applying input program and control information to said memory means.

4. A programmable terminal as set forth in claim 1 wherein said output means includes bit conversion means coupled to said internal selection means for converting digital data from parallel to serial format for transmission from said terminal.

5. A programmable terminal as set forth in claim 1 wherein said internal selection means includes code generating means for converting binary coded decimal internal signals to teletypewriter code for transmission by said output means.

6. A programmable terminal as set forth in claim 1 wherein the external selection means of said logic means comprises:
- a device decode circuit for selecting the external device being addressed; and
- a command circuit coupled to said logic means for supplying control signals to said external devices, causing the external device being addressed to respond.

7. A programmable terminal as set forth in claim 6 wherein said logic means further comprises:
- register means for storing output signals from said memory;
- function decoding means coupled to said register means for converting output signals from said memory into control signals.

8. A programmable terminal for operating on-line or off-line in conjunction with external devices capable of providing signals to said terminal or carrying out commands from said terminal comprising:
- memory means for storing program and control information;
- logic means coupled to said memory means and said external devices for receiving signals from said devices and applying command signals to said devices under the control of said memory means;
- internal selection means, connected to said logic means, for selecting one of a plurality of signals internal to said terminal for coupling out of said terminal;

and
- output means, coupled to said internal selection means, for transmitting said selected signal from said terminal.

9. A programmable terminal as set forth in claim 8 wherein said logic means comprises:
- register means for storing output signals from said memory;
- function decoding means coupled to said register means for converting output signals from said memory into control signals;
- device decoding means coupled to said register means for selecting the external device being addressed; and
- command circuit means coupled to said function decoding means for supplying control signals to said external devices, causing the external device being addressed to respond.

10. A programmable terminal as set forth in claim 9 wherein said logic means further comprises:

comparison means, coupled to said memory means, said external devices, and said function decoding means, for comparing information from said memory with information from said devices, to produce a comparison signal; and means for coupling said comparison signal to said memory thereby providing closed loop control of an external device.

11. A programmable terminal as set forth in claim 8 and further comprising:

auxiliary memory for temporarily storing a predetermined quantity of information, said auxiliary memory means being coupled to said internal selection means and coupled to and controlled by said logic means.

12. A programmable terminal as set forth in claim 8 and further comprising:

receive decode means coupled to said memory means for applying input program and control information to said memory means.

* * * * *